UNITED STATES PATENT OFFICE.

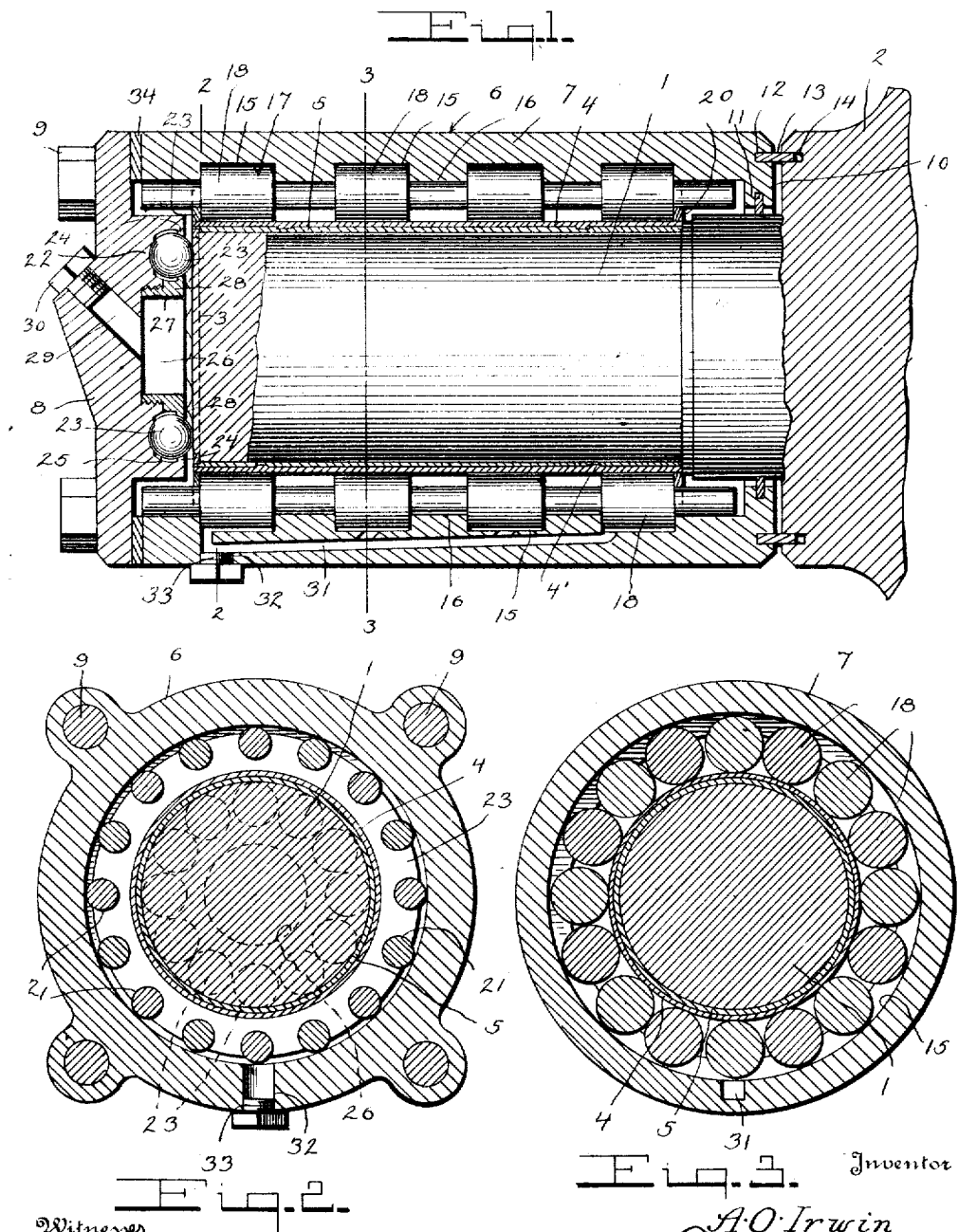

ASA O. IRWIN, OF FORT MILLS, PHILIPPINE ISLANDS.

BALL AND ROLLER BEARING FOR JOURNAL-BOXES.

1,212,065.  Specification of Letters Patent.  Patented Jan. 9, 1917.

Application filed July 19, 1916.  Serial No. 110,164.

*To all whom it may concern:*

Be it known that I, ASA O. IRWIN, a citizen of the United States, residing at Fort Mills, Philippine Islands, have invented certain new and useful Improvements in Ball and Roller Bearings for Journal-Boxes; and I do hereby declare the following to be a full, clear, and exact description of the invention, such as will enable others skilled in the art to which it appertains to make and use the same.

This invention relates to journal bearings for axles or shafts and the like and more particularly to devices employing rollers and balls, or similar anti-friction devices arranged in a boxing or the like around and at the end of the axle or shaft to take up direct friction from the axle or shaft and to resist end thrust, obviating the objection of heretofore proposed bearings, where the rollers rotate on their axes much faster than the axle or shaft.

An object of this invention is to provide rollers with large and small diameters, the smaller diameter of the rollers to engage the surfaces provided on the inside of the boxing and the larger diameter of the rollers to engage the bearing surface of the axle or shaft, thus reducing the speed of the rollers around the inside of the boxing.

Another object of this invention is to provide guide rings to fit loosely over the smaller diameter and at each end of the rollers to cause said rollers to move in unison.

A further object of this invention is to provide means for efficiently lubricating the rollers and balls at all times and whereby the lubricating material may be drained.

A still further object of this invention is to provide ball and roller bearings for journal boxes of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a longitudinal sectional view of a ball and roller bearing for journal boxes, constructed in accordance with my invention, Fig. 2 is a transverse sectional view taken on the line 2—2 of Fig. 1, and Fig. 3 is a similar view taken on the line 3—3 of Fig. 1.

Referring in detail to the drawing, the numeral 1 indicates an axle or shaft, having a suitable hub 2 formed on one end thereof and its opposite end screw-threaded to receive a retaining ring 3. A steel casing 4 of greater diameter than the axle or shaft 1, has a plurality of retaining lugs 4' formed upon the interior thereof and is positioned upon the axle or shaft 1, providing a space between the casing 4 and the axle or shaft, which is filled with babbitt, by first removing the ring 3 and pouring the babbitt therein, in liquid form, to provide a Babbitt bearing 5 for the axle or shaft and being retained within the casing 4 by the lug 4'. The end of the Babbitt bearing 5 is reamed to provide an annular shoulder for the reception of the ring 3 when threaded to the end of the axle or shaft 1.

A boxing 6, consists of a casing 7 of cylindrical formation upon the interior thereof and having a head 8 secured to one end by bolts 9. The opposite end of the casing 7 has an inwardly directed annular shoulder 10, having an annular groove in the face thereof to receive a packing gasket 11 which engages the reduced portion of the hub 2. The end of the casing 7 which carries the shoulder 10 has an annular groove 12 for the reception of a packing gasket 13 which is received by an annular groove 14 in the hub 2, for coöperation with the gasket 11 to form an absolute dust and leak proof connection between the casing 7, the axle or shaft 1 and the hub 2.

The casing 7 is provided with a plurality of annular grooves 15 which form bearings 16 therebetween. A plurality of rollers 17, having enlarged bearing members 18 of equal diameter and small bearing members 19 of equal diameter. The bearing members 18 being located within the annular grooves 15 for an engagement with the casing 4 of the axle or shaft 1 and the bearing members 19 rest upon the bearings 16 of the casing 4, for journaling the rollers 17. Guide rings 20 are mounted on each end of the casing 4 and turn freely thereon and are provided with a circular series of substantially semi-circular grooves 21 for receiving the ends of the rollers 17 to cause them to move or rotate in unison.

The casing 7 projects beyond the outer end of the axle or shaft 1 as clearly illustrated in Fig. 1 to receive a circular enlargement 22 formed on the inner face of the head 8, which has formed thereon an annular groove forming a portion of a race way to receive ball bearings 23. An annular shoulder 24 is formed on the inner face of the enlargement 22 for an engagement with the ball bearings 23. The shoulder 24 has an annular groove which forms a portion of a lubricating groove 25 for lubricating the ball bearings 23. The head 8 is provided with a circular recess 26 in the center thereof, which is provided with its walls screw-threaded to receive a screw-threaded retaining ring 27, having an annular flange 28 formed thereon, which is grooved to form the remaining portion of the lubricating groove 25, and is further provided with an inclined face 28 to engage the other side of the ball bearings 23. It will be noted that the ball bearings 23 bear against the head 8 or the race way therein, the shoulder 24, flange 28 and the end of the axle or shaft 1, to take up all end thrust upon the axle or shaft. An upwardly inclined opening 29 is formed in the head 8 and communicates with the recess 26 and is screw-threaded to receive a plug 30, whereby the ball bearings 23 and rollers 17 may be furnished with lubricating materials by filling the recess 26 by way of the opening 29. The lower wall of the casing 7 is provided with a downwardly inclined groove or channel 31, having branches which communicate with the annular grooves 15 and having an opening 32 communicating with its lowermost end which is screw-threaded to receive a plug 33, whereby the lubricant within the casing 7 may be drained therefrom. A suitable gasket 34 is positioned between the head 8 and the casing 7 to provide a dust and liquid proof connection.

From the foregoing description taken in connection with the accompanying drawing, it will be noted that the casing 4 normally turns or rotates with the axle or shaft 1, but if the rollers become unserviceable and refuse to rotate, the casing 4 remains stationary and the axle or shaft 1 is free to rotate within the Babbitt bearing 5, preventing injury to the casing 4 or the rollers.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a shaft, a casing thereon, a Babbitt bearing positioned between the casing and the shaft, a casing surrounding the first mentioned casing, a head detachably secured to the second mentioned casing, said second mentioned casing provided with annular grooves providing bearings therebetween, rollers consisting of large and small bearing members positioned within the second mentioned casing, said small bearing members resting upon the bearings within the second mentioned casing, and said large bearing members located within the annular grooves and bearing upon the first mentioned casing, and means carried by the first mentioned casing for causing the rollers to rotate in unison.

2. A device of the character set forth comprising an axle, a casing surrounding said axle and spaced therefrom, inwardly directed lugs formed on said casing, Babbitt material molded in said casing between the casing and the axle and retained in said casing by the lugs, a boxing surrounding the casing, and rollers journaled in said boxing and bearing upon said casing to rotatably support the boxing.

In testimony whereof I affix my signature.

ASA O. IRWIN.